US011220039B2

(12) United States Patent
Lindsey et al.

(10) Patent No.: US 11,220,039 B2
(45) Date of Patent: Jan. 11, 2022

(54) PEX EXPANSION TOOL

(71) Applicant: MILWAUKEE ELECTRIC TOOL CORPORATION, Brookfield, WI (US)

(72) Inventors: Jacob K. Lindsey, Milwaukee, WI (US); Ryan J. Denissen, Sussex, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 16/566,394

(22) Filed: Sep. 10, 2019

(65) Prior Publication Data

US 2020/0094465 A1 Mar. 26, 2020

Related U.S. Application Data

(60) Provisional application No. 62/736,286, filed on Sep. 25, 2018.

(51) Int. Cl.
*B29C 57/00* (2006.01)
*B29C 57/04* (2006.01)
*B29D 23/00* (2006.01)
*B29C 57/02* (2006.01)
*B29L 23/00* (2006.01)
*B29K 23/00* (2006.01)

(52) U.S. Cl.
CPC ............ *B29C 57/045* (2013.01); *B29C 57/02* (2013.01); *B29D 23/001* (2013.01); *B29K 2023/0691* (2013.01); *B29L 2023/22* (2013.01)

(58) Field of Classification Search
CPC ......... B29C 57/00; B29C 57/02; B29C 57/04; B29C 57/002; B29C 57/005; B29C 57/045
USPC ................................................... 425/392, 394
See application file for complete search history.

(56) References Cited

U.S. PATENT DOCUMENTS

| 1,931,352 A | 10/1933 | Kemp |
| 5,090,230 A | 2/1992 | Koskinen |
| 5,744,085 A | 4/1998 | Sorberg |
| 5,928,451 A * | 7/1999 | Johansson ............... B29C 57/02 425/393 |

(Continued)

FOREIGN PATENT DOCUMENTS

| CN | 200970605 Y | 11/2007 |
| CN | 201346601 Y | 11/2009 |

(Continued)

*Primary Examiner* — Joseph S Del Sole
*Assistant Examiner* — Thu Khanh T Nguyen
(74) *Attorney, Agent, or Firm* — Michael Best & Friedrich LLP

(57) ABSTRACT

An expansion tool includes a housing and an expansion head coupled to the housing. The expansion head includes a casing and a plurality of jaws extending from the casing. The plurality of jaws is movable between a closed position and an expanded position relative to a longitudinal axis. Each jaw of the plurality of jaws includes a first sizing portion extending parallel to the longitudinal axis and a second sizing portion extending parallel to the longitudinal axis. The first sizing portions of the plurality of jaws collectively define a first diameter when the plurality of jaws is in the closed position, the second sizing portions of the plurality of jaws collectively define a second diameter when the plurality of jaws is in the closed position, and the second diameter is greater than the first diameter.

14 Claims, 4 Drawing Sheets

(56) References Cited

U.S. PATENT DOCUMENTS

| | | | |
|---|---|---|---|
| 6,457,966 B1 * | 10/2002 | Savioli | B29C 57/04 |
| | | | 425/389 |
| 6,832,502 B1 | 12/2004 | Whyte et al. | |
| 7,059,162 B1 | 6/2006 | Tarpill et al. | |
| 7,578,161 B1 * | 8/2009 | Sizemore | B21D 41/021 |
| | | | 29/890.043 |
| 9,248,617 B2 | 2/2016 | Lundequist et al. | |
| 11,110,646 B2 | 9/2021 | Brochman | |
| 2015/0128644 A1 | 5/2015 | Sarac | |

FOREIGN PATENT DOCUMENTS

| | | |
|---|---|---|
| CN | 201644657 U | 11/2010 |
| CN | 203470706 U | 3/2014 |
| CN | 205414182 U | 8/2016 |
| CN | 106077300 A | 11/2016 |
| CN | 206677054 U | 11/2017 |
| CN | 207563602 U | 7/2018 |
| DE | 1552050 A1 | 9/1970 |
| DE | 1752461 B2 | 5/1971 |
| DE | 2552607 A1 | 6/1977 |
| DE | 202009010896 U1 | 12/2009 |
| EP | 2558230 B1 | 2/2013 |
| WO | WO 2017129540 A1 | 8/2017 |
| WO | 2021016417 A1 | 1/2021 |

\* cited by examiner

PEX EXPANSION TOOL

CROSS-REFERENCE TO RELATED APPLICATIONS

This application claims priority to U.S. Provisional Application No. 62/736,286, filed Sep. 25, 2018, the entire content of which is incorporated by reference herein.

FIELD OF THE INVENTION

The present invention relates to a tool for expanding pipe and tubing. More particularly, the present invention relates to PEX (cross-linked polyethylene) expansion tools.

BACKGROUND OF THE INVENTION

PEX tubing is commonly used in plumbing applications as a substitute for copper pipe. PEX tubing can be coupled to fittings in various ways. Crimp rings or clamp rings can be compressed on to the outside of PEX tubing over a fitting to couple the PEX tubing to the fitting. Alternatively, the PEX tube can be expanded and the fitting inserted into the expanded end of the PEX tube. The PEX tube elastically recovers around the fitting to form a tight connection. Tools used to expand PEX tube for this purpose are referred to as PEX expansion tools.

PEX tubing comes in a variety of different nominal diameters or "sizes," with actual dimensions governed by standards, such as ASTM F876. ½-inch and ¾-inch are two commonly used sizes of PEX tubing. Conventional PEX expansion tools are only compatible with a single size of PEX tubing, and as such a different PEX expansion tool must be used when working with a different size of PEX tubing.

SUMMARY OF THE INVENTION

The present disclosure provides, in one aspect, an expansion tool including a housing and an expansion head coupled to the housing. The expansion head includes a casing and a plurality of jaws extending from the casing. The plurality of jaws is movable between a closed position and an expanded position relative to a longitudinal axis. Each jaw of the plurality of jaws includes a first sizing portion extending parallel to the longitudinal axis and a second sizing portion extending parallel to the longitudinal axis. The first sizing portions of the plurality of jaws collectively define a first diameter when the plurality of jaws is in the closed position, the second sizing portions of the plurality of jaws collectively define a second diameter when the plurality of jaws is in the closed position, and the second diameter is greater than the first diameter.

The present disclosure provides, in another aspect, an expansion tool including a housing and an expansion head coupled to the housing. The expansion head includes a casing and a plurality of jaws extending from the casing. The plurality of jaws is movable between a closed position and an expanded position relative to a longitudinal axis. Each jaw of the plurality of jaws includes a first tapered portion and a first sizing portion insertable into a first tube of a first nominal size to expand the first tube, and each jaw of the plurality of jaws includes a second tapered portion and a second sizing portion insertable into a second tube of a second nominal size to expand the second tube. The second nominal size is greater than the first nominal size.

The present disclosure provides, in another aspect, an expansion tool configured to expand tubing of a first nominal size and tubing of a second nominal size greater than the first nominal size. The expansion tool includes a housing and an expansion head coupled to the housing. The expansion head includes a casing and a plurality of jaws extending from the casing. The plurality of jaws is movable between a closed position and an expanded position relative to a longitudinal axis. Each jaw of the plurality of jaws includes a first sizing portion corresponding to the first nominal size and a second sizing portion corresponding to the second nominal size such that the jaw has a stepped outer profile.

Other aspects of the disclosure will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
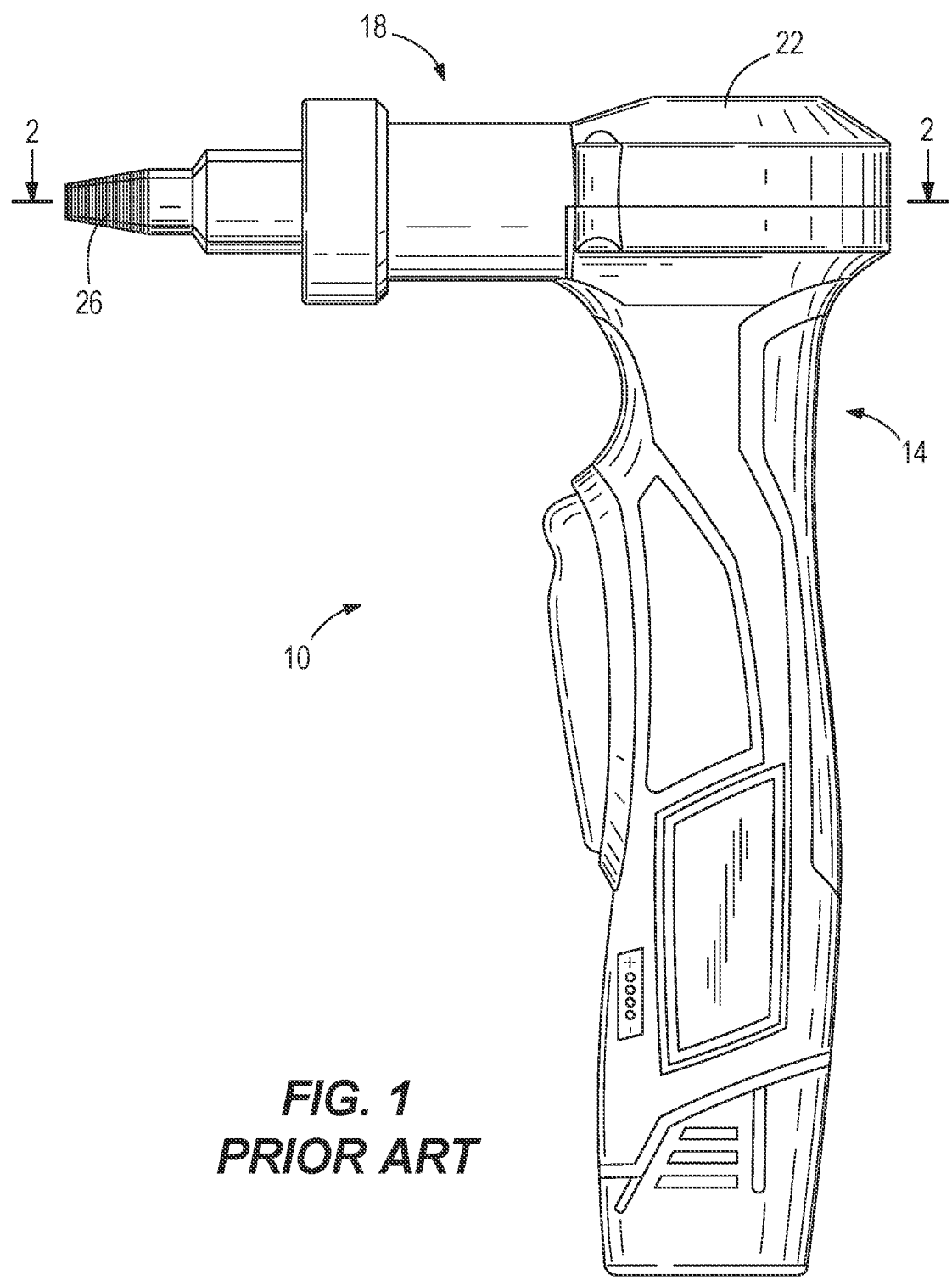
FIG. 1 is a side view of an expansion tool according to one embodiment.
Figure 2:
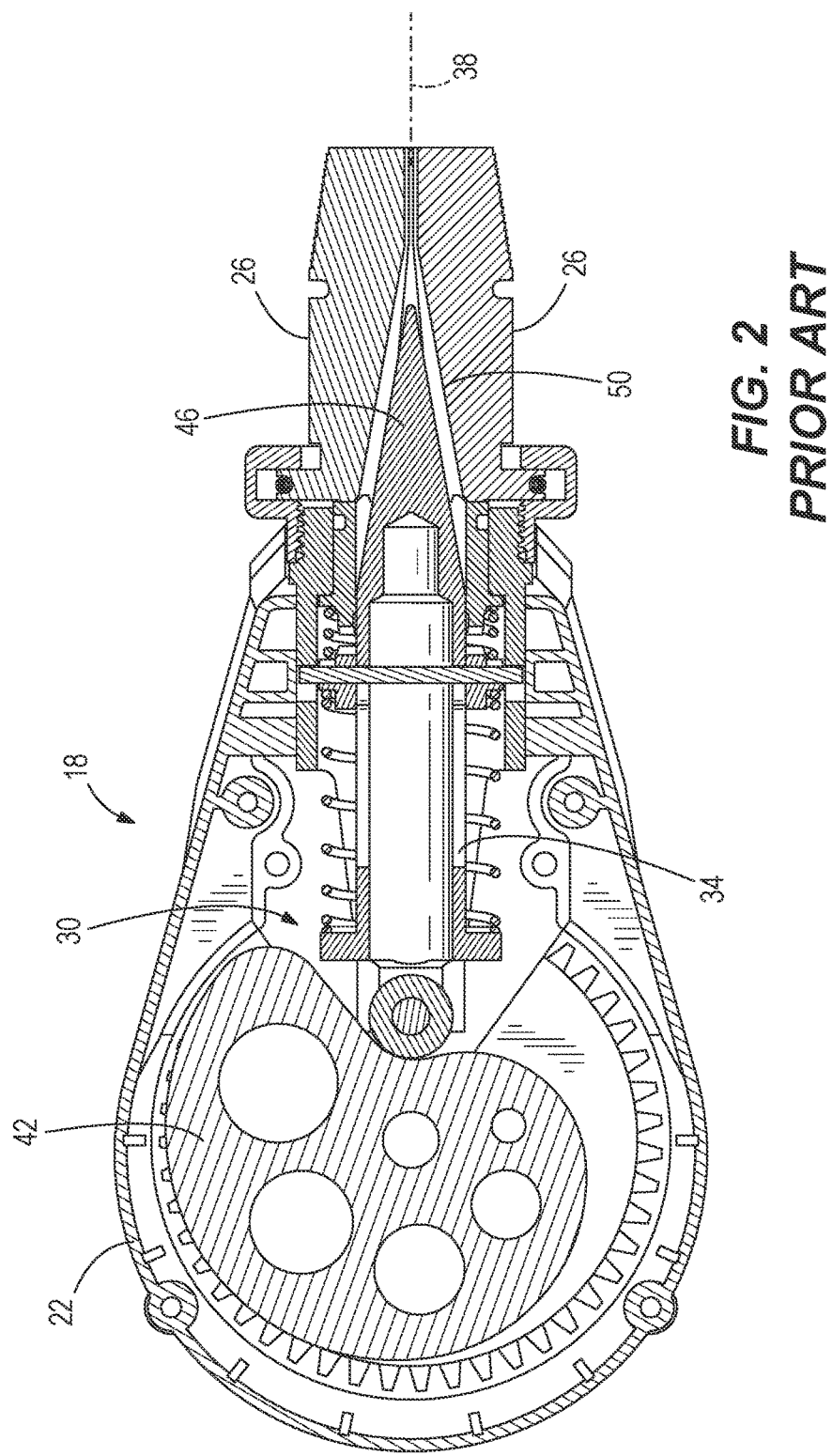
FIG. 2 is a cross-sectional view taken along line 2-2 in FIG. 1.

FIG. 1 illustrates an expansion tool 10 usable to expand PEX tubing prior inserting a fitting. The expansion tool 10 includes a housing 14 and an expansion head 18 coupled to the housing 14. With reference to FIG. 2, the expansion head 18 includes a casing 22, a plurality of jaws 26 extending from the casing 22, and a drive mechanism 30 housed within the casing 22. The drive mechanism 30 is configured to convert a rotational input (e.g., from a motor; not shown) into expansion of the jaws 26.

In the illustrated embodiment, the drive mechanism 30 includes a spindle 34 reciprocable within the casing 22 along an axis 38 in response to rotation of a cam 42, and wedge 46 coupled to a distal end of the spindle 34 for axial movement therewith. The wedge 46 is disposed within a space 50 defined by the inner sides of the jaws 26. The jaws 26 are movable from an initial or closed position (illustrated in FIGS. 1 and 2) toward an expanded position (not shown) in response to movement of the spindle 34 and the wedge 46 toward the jaws 26 along the axis 38. The jaws 26 may be biased toward the closed position by a spring, such that the jaws 26 return to the closed position when the spindle 34 and the wedge 46 retract. In some embodiments, the spindle 34, the wedge 46, and/or the jaws 26 may be configured to rotate about the axis 38 before, during, or after expansion of the jaws 26. Additional details of the expansion tool 10 are described and illustrated in U.S. Pat. No. 8,763,439 to Milwaukee Electric Tool Corporation, the entire content of which is incorporated herein by reference.

Figure 3:
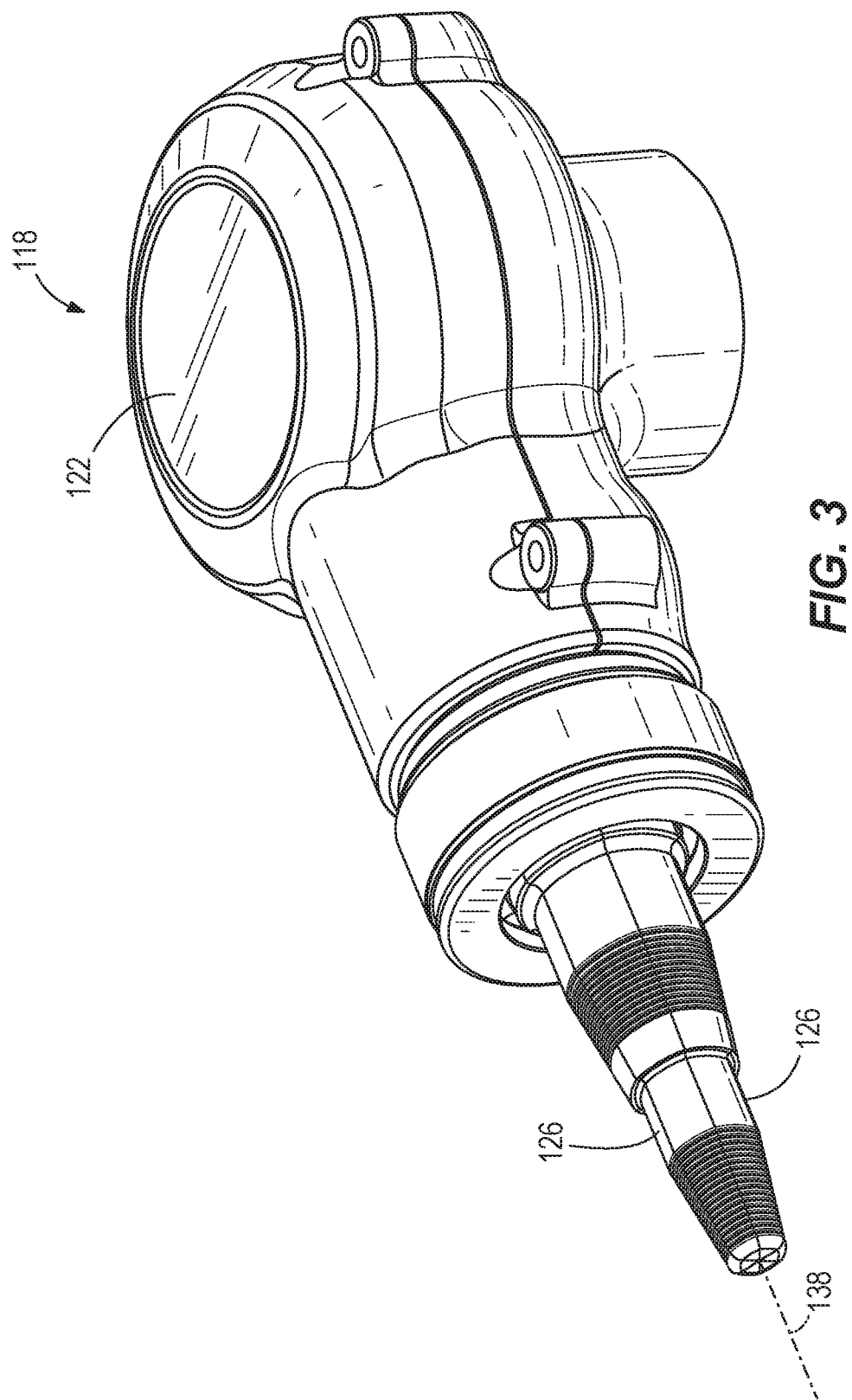
FIG. 3 is a perspective view of an expansion head according to an embodiment of the present disclosure that is usable with the expansion tool of FIG. 1.

FIG. 3 illustrates an expansion head 118 according to one embodiment of the present disclosure. The expansion head 118 is usable with the expansion tool 10 described above with reference to FIGS. 1 and 2, for example (i.e. in place of the expansion head 18). Alternatively, the expansion head 118 may be incorporated into other power tools or hand tools.

The illustrated expansion head 118 includes a casing 122, a plurality of jaws 126 extending from the casing 122, and a drive mechanism (not shown) housed within the casing 122. The drive mechanism may be the same as the drive mechanism described above with reference to FIG. 2; however, other drive mechanisms may be used. The drive mechanism is configured to reciprocate the jaws 126 between an initial or closed position (FIGS. 3 and 4) and an expanded position (FIG. 5). In the expanded position, the jaws 126 are pushed radially outward from a longitudinal axis 138 of the expansion head 118 by the drive mechanism.

Figure 4:
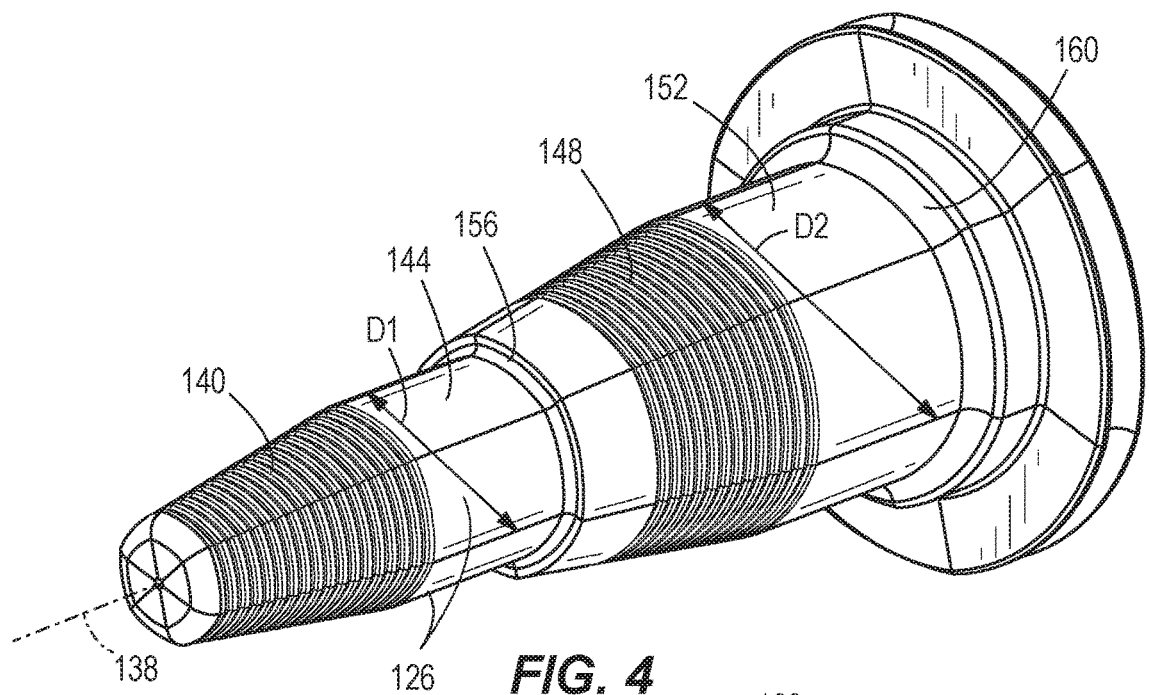
FIG. 4 is a perspective view illustrating a plurality of jaws of the expansion head of FIG. 3 in an closed position.
Figure 5:
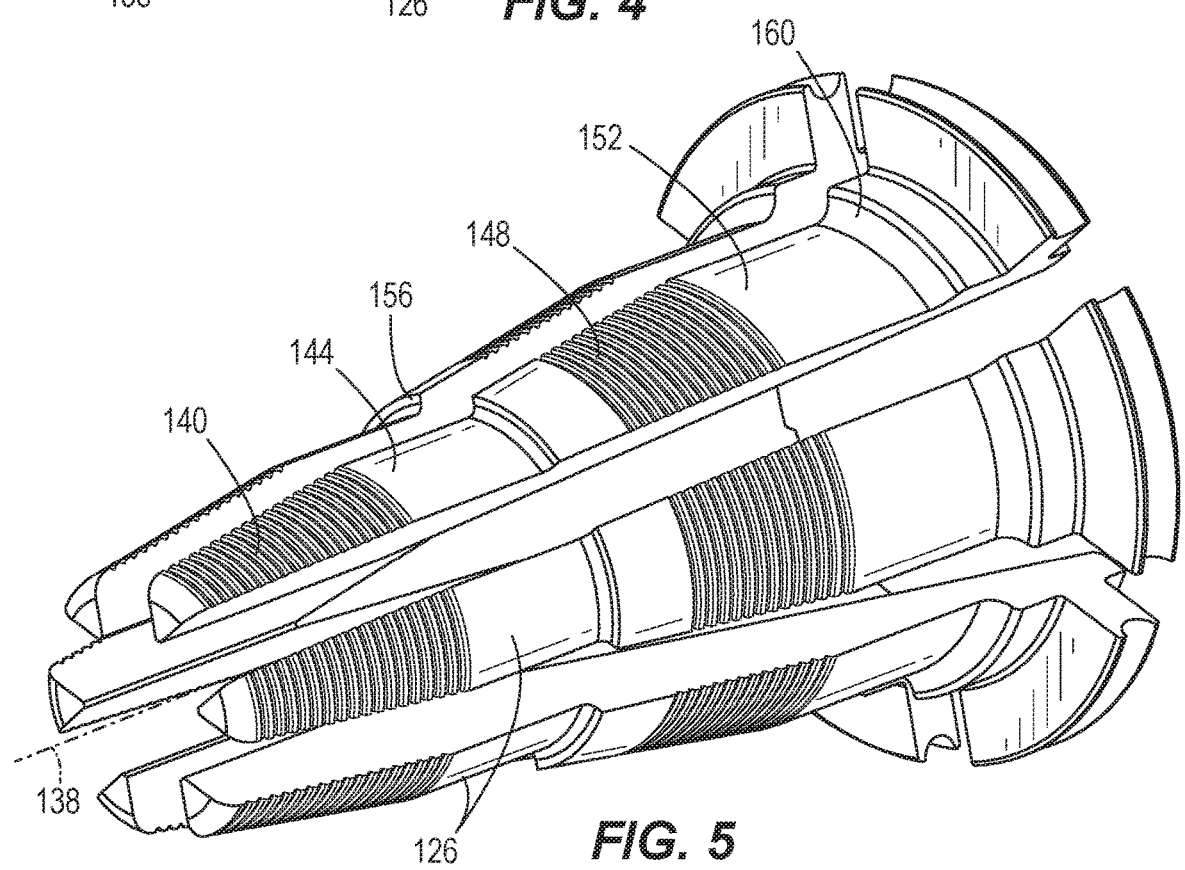
FIG. 5 is a perspective view illustrating the plurality of jaws of FIG. 4 in an expanded position.

Referring to FIGS. 4 and 5, each of the jaws 126 includes an exterior side with a first tapered portion 140, a first sizing portion 144 adjacent the first tapered portion 140, a second tapered portion 148, and a second sizing portion 152 adjacent the second tapered portion 148. The first tapered portion 140 and the second tapered portion 148 extend obliquely relative to the longitudinal axis 138, and the first sizing portion 144 and the second sizing portion 152 extend substantially parallel with the longitudinal axis 138. In the illustrated embodiment, each of the jaws 126 includes a first shoulder 156 between the first sizing portion 144 and the second tapered portion 148. Each of the jaws 126 also includes a second shoulder 160 defining an end of the second sizing portion 152 opposite the second tapered portion 148.

The first sizing portions 144 of each of the jaws 126 collectively define a first diameter or maximum cross-sectional dimension D1 when the jaws 126 are in the closed position, and the second sizing portions 152 of each of the jaws 126 collectively define a second diameter or maximum cross-sectional dimension D2 when the jaws 126 are in the closed position. The second dimension D2 is greater than the first dimension D1, such that the jaws 126 have a stepped outer profile. In the illustrated embodiment, the first dimension D1 is sized for proper expansion of PEX tubing of a first nominal size when the jaws 126 are inserted into an end of the PEX tubing, and the second dimension D2 is sized for proper expansion of PEX tubing of a second, greater nominal size when the jaws 126 are inserted into an end of the PEX tubing. In this way, the diameter D1 of the first sizing portions 144 corresponds to the first nominal size, and the diameter D2 of the second sizing portions 152 corresponds to the second nominal size.

In some embodiments, the first nominal size is ½-inch, and the second nominal size is ¾-inch. As such, the second nominal size may be about 50% greater than the first nominal size. In such embodiments, the second dimension D2 may also be about 50% greater than the first dimension D1. However, the first dimension D1 and the second dimension D2 may be configured for proper expansion of PEX tubing of other nominal sizes.

In use, to expand ½" PEX tubing, for example, the first tapered portions 140 of the jaws 126 are inserted into an end of the PEX tubing and expanded radially outwardly. The drive mechanism reciprocates the jaws 126 between the closed (FIG. 4) and expanded positions (FIG. 5), which gradually expands the end of the tubing. As the tubing expands, the operator pushes the jaws 126 deeper into the tubing until the first sizing portions 144 are received within the tubing, and the end of the tubing abuts the first shoulder 156. This indicates to the operator that expansion is complete. The jaws 126 can then be withdrawn from the tubing, and the operator inserts a fitting into the end of the tubing. The tubing then elastically recovers and secures the fitting in place.

To expand ¾" PEX tubing, the jaws 126 are inserted into the end of the tubing until the second tapered portions 148 engage the inside of the tubing. As such, the first tapered portions 140, the first sizing portions 144, and the first shoulder 156 are inserted completely into the tubing. The drive mechanism reciprocates the jaws 126 between the closed and expanded positions, which gradually expands the end of the tubing. As the tubing expands, the operator pushes the jaws 126 deeper into the tubing until the second sizing portions 152 are received within the tubing, and the end of the tubing abuts the second shoulder 160. This indicates to the operator that expansion is complete. The jaws 126 can then be withdrawn from the tubing, and the operator inserts a fitting into the end of the tubing. The tubing then elastically recovers and secures the fitting in place.

Thus, the present disclosure provides an expansion head for a PEX expansion tool capable of expanding multiple sizes of PEX tubing without modifying or replacing any components of the expansion head. This advantageously improves versatility and efficiency of the PEX expansion tool.

Various features and aspects of the invention are set forth in the following claims.

What is claimed is:

1. An expansion tool comprising:
a housing;
an expansion head coupled to the housing, the expansion head including a casing and a plurality of jaws extending from the casing, the plurality of jaws movable between a closed position and an expanded position relative to a longitudinal axis,
wherein each jaw of the plurality of jaws includes
a first sizing portion extending parallel to the longitudinal axis,
a first shoulder adjacent the first sizing portion, the first shoulder including a first edge defining an end of the first sizing portion, a second edge positioned radially outwardly from the first edge, and a first stop surface extending between the first edge and the second edge,
a second sizing portion extending parallel to the longitudinal axis,
a second shoulder adjacent the second sizing portion, the second shoulder including a third edge defining an end of the second sizing portion, a fourth edge positioned radially outwardly from the third edge, and a second stop surface extending between the third edge and the fourth edge,
a first tapered portion adjacent the first sizing portion such that the first sizing portion extends from the first tapered portion to the first edge, and
a second tapered portion extending from the second edge to the second sizing portion,
wherein the first sizing portions of the plurality of jaws collectively define a first diameter when the plurality of jaws is in the closed position,
wherein the second sizing portions of the plurality of jaws collectively define a second diameter when the plurality of jaws is in the closed position, and
wherein the second diameter is greater than the first diameter.

2. The expansion tool of claim 1, wherein the first sizing portion is spaced from the second sizing portion along the longitudinal axis.

3. The expansion tool of claim 1, further comprising a drive mechanism configured to reciprocate the jaws between the closed position and the expanded position.

4. An expansion tool comprising:
a housing;
an expansion head coupled to the housing, the expansion head including a casing and a plurality of jaws extending from the casing, the plurality of jaws movable between a closed position and an expanded position relative to a longitudinal axis,
wherein each jaw of the plurality of jaws includes a first tapered portion and a first sizing portion insertable into a first tube of a first nominal size to expand the first tube,
wherein each jaw of the plurality of jaws includes a second tapered portion and a second sizing portion insertable into a second tube of a second nominal size to expand the second tube,
wherein each jaw of the plurality of jaws includes a first shoulder having a first edge defining an end of the first sizing portion, a second edge positioned radially outwardly from the first edge, and a first stop surface extending between the first edge and the second edge,
wherein each jaw of the plurality of jaws includes a second shoulder having a third edge defining an end of the second sizing portion, a fourth edge positioned radially outwardly from the third edge, and a second stop surface extending between the third edge and the fourth edge,
wherein the second tapered portion extends from the second edge to the second sizing portion, and
wherein the second nominal size is greater than the first nominal size.

5. The expansion tool of claim 4, wherein the first nominal size is ½ inch.

6. The expansion tool of claim 4, wherein the second nominal size is ¾ inch.

7. The expansion tool of claim 4, wherein the second nominal size is about 50% greater than the first nominal size.

8. The expansion tool of claim 4, wherein the first tapered portion and the second tapered portion are obliquely oriented relative to the longitudinal axis, and wherein the first sizing portion and the second sizing portion extend parallel to the longitudinal axis.

9. The expansion tool of claim 8, wherein the first sizing portions collectively define a first diameter when the plurality of jaws is in the closed position, wherein the second sizing portions collectively define a second diameter when the plurality of jaws is in the closed position, and wherein the second diameter is about 50% greater than the first diameter.

10. The expansion tool of claim 4, wherein the first tapered portion, the first sizing portion, and the first shoulder are insertable into the second tube during expansion of the second tube.

11. An expansion tool configured to expand tubing of a first nominal size and tubing of a second nominal size greater than the first nominal size, the expansion tool comprising:
a housing;
an expansion head coupled to the housing, the expansion head including a casing and a plurality of jaws extending from the casing, the plurality of jaws movable between a closed position and an expanded position relative to a longitudinal axis,
wherein each jaw of the plurality of jaws includes a first sizing portion corresponding to the first nominal size, a second sizing portion corresponding to the second nominal size such that the jaw has a stepped outer profile, and a tapered portion extending between the first sizing portion and the second sizing portion, and
wherein each jaw of the plurality of jaws includes a first shoulder having a first edge defining an end of the first sizing portion, a second edge positioned radially outwardly from the first edge, and a first stop surface extending between the first edge and the second edge,
wherein each jaw of the plurality of jaws includes a second shoulder having a third edge defining an end of the second sizing portion, a fourth edge positioned radially outwardly from the third edge, and a second stop surface extending between the third edge and the fourth edge, and
wherein the tapered portion extends from the second edge to the second sizing portion.

12. The expansion tool of claim 11, wherein the first sizing portions of the plurality of jaws collectively define a first diameter when the plurality of jaws is in the closed position, wherein the second sizing portions collectively define a second diameter when the plurality of jaws is in the closed position, and wherein the second diameter is greater than the first diameter.

13. The expansion tool of claim 12, wherein the second diameter is about 50% greater than the first diameter.

14. The expansion tool of claim 11, wherein the first tapered portion, the first sizing portion, and the first shoulder are insertable into tubing of the second nominal size during expansion.

* * * * *